STRIPPING INSULATED WIRE

Original Filed March 3, 1969

INVENTORS.
HARRY B. MUELLER
GILBERT R. REID
BY
Jerold I. Schneider
AGENT

United States Patent Office 3,794,522
Patented Feb. 26, 1974

3,794,522

STRIPPING INSULATED WIRE

Harry B. Mueller, Westchester, and Gilbert R. Reid, Norristown, Pa., assignors to Burroughs Corporation, Detroit, Mich.

Continuation of abandoned application Ser. No. 803,567, Mar. 3, 1969. This application Jan. 24, 1972, Ser. No. 220,146
Int. Cl. B08b 7/02, 7/04, 11/00
U.S. Cl. 134—1 2 Claims

ABSTRACT OF THE DISCLOSURE

Method and apparatus for stripping insulation from a conductive wire using clean thermal energy. A jig and mask positioned between two thermal energy sources expose only that portion of the insulation to be removed. A portion of insulation adjacent to the exposed wire is cut and slid over the previously exposed wire. The wire thus exposed is free of contamination and thermal distortion.

This is a continuation of application Ser. No. 803,567, filed Mar. 3, 1969, now abandoned.

BACKGROUND OF THE INVENTION

Field of the invention

This invention has particularly utility in machines where long runs of multiwire electrical conductors are used and where connections to these wires are made along their length and at their end points, for example, in the backplane wiring of computers. Backplane wiring is used to interconnect various printed circuit boards and to interconnect the modular elements which are becoming prevalent in computer design. Computers require a great deal of coated wire cable, usually of the flat type, which can be used to make right angle bends around corners and posts and which can be layered and bundled for ease in handling. As the name implies, flat cable refers to a group of wires which are coplanar and usually individually insulated. A well-known example of two-wire flat cable is the cable used to connect a television antenna to a television set. This is distinguished from a coaxial cable where the bundle of wires has a generally circular cross section. Each of the individually insulated wires in the flat cable may be either solid or stranded.

Because of the high-speed characteristics of modern computers a high-quality dielectric insulation is required to eliminate stray signals effectively. Teflon insulation has been found extremely satisfactory for this purpose. Teflon is the DuPont trademark for the fluorocarbon resin film tetrafluoroethylene. Teflon TFE refers to DuPont's high molecular weight homopolymer of tetrafluoroethylene; suiable processes for the preparation of Teflon TFE arc described in U.S. Pats No. 2,478,229 and No. 2,559,752. Teflon FEP refers to DuPont's high molecular weight copolymer of TFE (tetrafluoroethylene) and HFP (hexafluoropropylene) having a TFE/HFP ratio in the range of about 90/10 to about 50/50 and preferably about 85/15. Suitable methods of preparation of Teflon FEP are described in U.S. Pat. No. 2,946,763. These Teflon films may contain pigments, fillers and other film-forming polymers as described in U.S. Pat. No. 2,820,752. Kapton or Polykapton are DuPont trademarks for polyimide films; such polyimide films are described in U.S. Pat. No. 3,179,634. Within the context of our invention, therefore, the terms "poly-insulation" and other forms of "insulation" accompanied by the prefix "poly-" will be used to include insulation made of any one or more of the following: Teflon, Teflon TFE, Teflon FEP, Kapton, and other polymers, copolymers, vinyls, vinylchlorides, polyimides and other materials having high dielectric properties and should be so construed except when such construction results in an ambiquity. The problem which occurs in stripping poly-insulated wire results from the inherent slipperiness and resistance to splitting or tearing of the coating.

Description of the prior art

Processes for stripping the insulation from wire conductors (both single and multiple strand) are generally well-known but they have not been satisfactory when used on poly-insulation prior to our novel method.

The known mechanical method employs wire strippers. While these may be satisfactory for stripping the ends of the wire, the strippers do not adequately provide for removal of a section of poly-insulation along the wire. When the poly-insulation is cut and pulled away from the wire it does not split off due to its high elasticity and, upon removal of the stripping tool, the poly-insulation returns to its original position. Furthermore, if the cable is made up of finely stranded wires, the poor tolerance of the stripper blade tends to cause nicks in the strands. These nicks are weak spots where the strands easily break off causing different resistances at different parts of the cable.

Another method is to burn off the insulation. This has been accomplished with an electrically heated filament or a flame. Prior burning techniques are unsatisfactory since they leave an oxide coating on the wire and do not leave a clean edge on the remaining insulation. Furthermore such burning cannot readily be confined to a single wire in a flat-type cable. Finally, burning (oxidation by application of heat) has been unsatisfactory because at the high temperatures (2000–2500° F.) needed to remove poly-insulation, the filament has a short useful life. An example of the burning technique operable at temperatures in the area of 1550° F. is found in U.S. Pat. No. 3,374,117, Savage, issued Mar. 19, 1968.

Another prior art technique using coherent light (lasers) has not been satisfactory since the laser beam is so small (a few microns in diameter) that it must be scanned over the total area where insulation is to be removed. In addition, the laser beam penetrates through the insulation and damages the conductor. Furthermore, we are not aware of any successful apparatus to remove insulation from both sides of the conductor at the same time using lasers.

A prior method based on the chemical property of the insulation is to burn off the insulation by acid treatment. However poly-insulation substances are highly acid-resistant and the acid technique is unsatisfactory.

SUMMARY OF THE INVENTION

It is accordingly the principal object of this invention to provide a new and improved method and apparatus for the removal of poly-insulation from a conductor.

It is still another object of the invention to provide a new and improved method and apparatus which is particularly suitable for removing insulation from flat-type cable.

A further object of our invention is to provide a new and improved method and apparatus for selectively removing insulation from individual insulated conductors of a flat-type cable.

It is a still further object of our invention to provide a new method and apparatus for removal of poly-insulation from a conductor leaving the exposed length of conductor free of contamination to provide a good electrical contact.

These and other objects are accomplished by exposing the portion of the poly-insulated single or multiple strand conductor to be stripped to clean thermal energy, specifically infrared or ultraviolet radiation, at a high temperature and for a short duration, to evaporate or otherwise disintegrate the poly-insulation.

The basic poly-insulators as defined above, evaporate under clean thermal energy without leaving any residue on the conductors, thereby providing excellent electrical contact.

Poly-insulation is manufactured in colors as well as in transparent form. Pigments in the colored insulation may not disintegrate completely under irradiation and may leave a contamination on the surface of the wires, even though the irradiation is performed in an inert atmosphere. This contamination may be ultrasonically cleaned, if desired.

After the irradiation, an adjacent section of the poly-insulation is severed and slid over the previously exposed wire to expose new portions of the wires. These newly exposed wires were not directly exposed to the clean thermal energy and are, therefore, free of thermal distortion. Furthermore, the newly exposed wires have a uniform density since they were not exposed to stress from the jig. The apparatus involved includes two radiation sources with a workholder disposed therebetween. The workholder or jig is used with an apertured shield, or mask, for exposing only the portions of the insulation to be removed.

When transparent or neutral colored poly-insulation is used, the poly-insulation may be coated with a heat-absorbing color, e.g., black, brown or red, to increase the speed of heat absorption of the insulation.

The foregoing objects and features of novelty which characterize our invention, as well as other objects, are pointed out with particularity in the claims which form a part of the present specification. For a better understanding of the invention, its features and the specific advantages attained with its use, reference should be had to the accompanying figures and descriptive matter.

BRIEF DESCRIPTION OF THE FIGURES

In the drawings, wherein like reference characters identify corresponding parts:

FIG. 3, comprising

DETAILED DESCRIPTION

Figure 1:
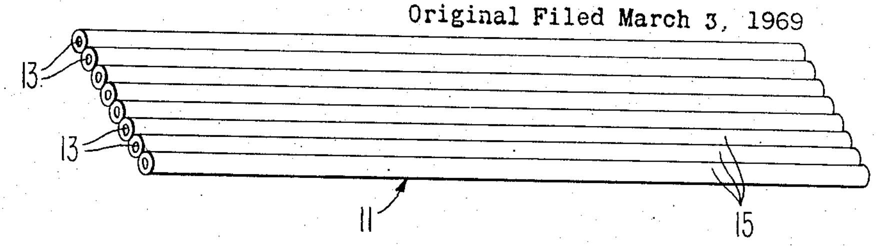
FIG. 1 is a perspective view of a section of a flat wire cable.

FIG. 1 illustrates a flat-pack cable 11 having a series of conductors 13 (each of which may be single or stranded). Each conductor 13 is surrounded by a poly-insulating material 15. Eight wires are shown in this flat cable. However, it must be realized that this is merely illustrative, the number of wires depends upon the user's requirements and the size and ease of manipulation of the cable.

Figure 2:
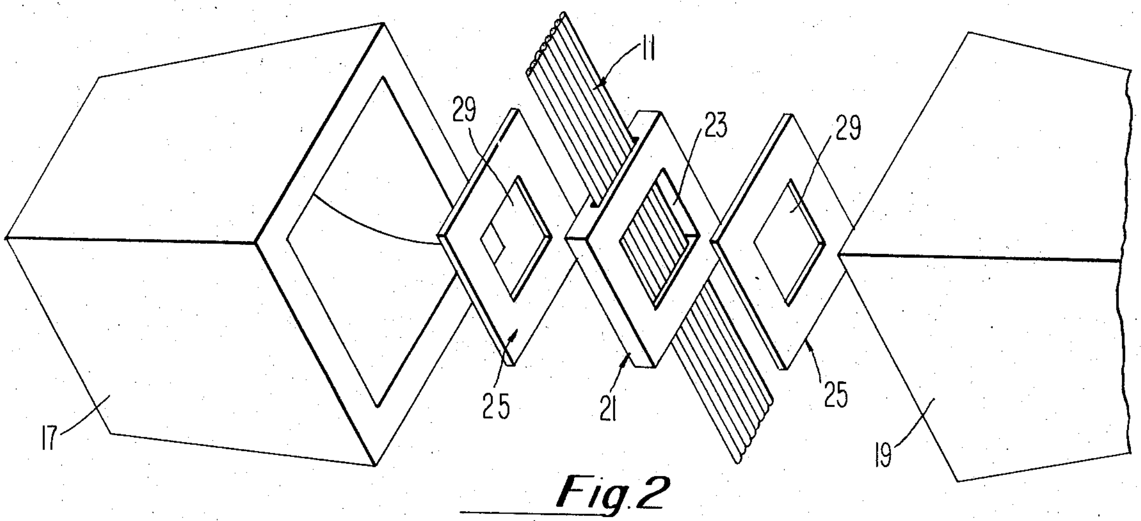
FIG. 2 is a schematic representation of the apparatus for removing the poly-insulation by clean thermal energy.

FIG. 2 shows, in schematic form, applicants' apparatus for removal of the poly-insulation. Sources or generators 17 and 19 are cylindrical-ellipse type reflectors having, for example, an infrared or ultraviolet source at their focal point, and as seen in FIG. 2, they are horizontally opposed. Generators of this type are commercially available as for example those made by Spectra Corporation, Trenton, N.J. These generators provide "clean thermal energy" which, as used in the art, refers to irradiation which is free of both electron flow and flame. Intermediate the generators 17 and 19 is a jig 21 which operates to clamp the cable with the wires 13 in a vertical position. The jig 21, which operates both as a workholder and heat sink, has an aperture 23 therein and a mask 25 on each side, each mask having an opening 29 therein. The masks are shown, for illustrative purposes, as being separated from jig 23, but, in actual use, the masks and jig are in contact. The apparatus of FIG. 2 is shown in a horizontal plane. It should be appreciated that the apparatus and cable could be rotated 90° such that the generators 17 and 19 are vertically opposed. A fan (not shown) is used with the generators to remove fumes as the poly-insulation disintegrates. The jig 21 and masks 25 are shown as three separate units but clearly if the jig 21 has appropriate apertures 23 then only one mask 25, on the opposite side of the cable from the jig 21, would be necessary.

Figure 3A:
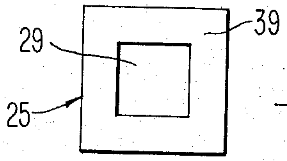
FIGS. 3A and 3B, is a front view of two apertured shields or masks.
Figure 3B:
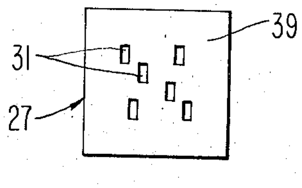

FIG. 3A shows a front view of the mask 25 of FIG. 2 having the aperture 29 and having surface 39 of a radiation-reflecting material such as aluminum. The use of this mask 25 will result in the removal of poly-insulation 15 from all the wires 13 as seen, for example, in FIG. 4. In FIG. 3B a different mask 27 is shown having a series of openings 31. Using a mask such as 27 the insulation 15 may be selectively removed, that is, the poly-insulation need not be removed from all the wires 13 at the same area along its length. Care must be taken that the apertures in the two masks are aligned so that the poly-insulation is removed from the front and back of the same portion of wire.

Figure 4:
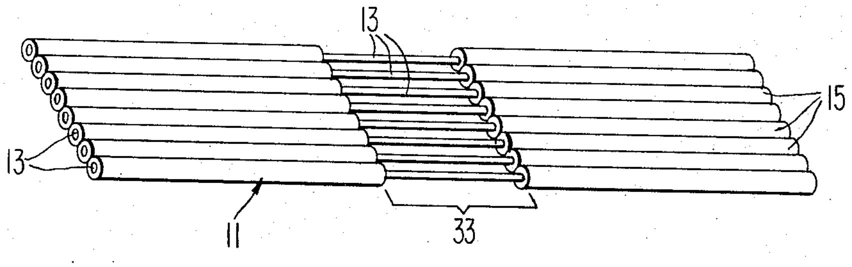
FIG. 4 is a perspective view of a portion of the flat cable wherein a segment of insulation has been removed.
Figure 5:
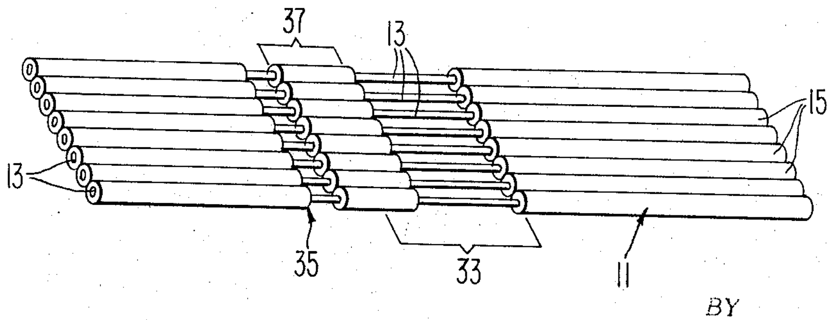
FIG. 5 is a perspective view showing an adjacent section of the insulation being slid into the place of the thermal-energy-removed section of insulation.

Referring now to FIG. 4, a perspective view of a flat-type cable 11 is shown with a portion of the poly-insulation 15 having been removed. The area where the poly-insulation has been removed 33 has a length L and the wires 13 are exposed throughout this length. This illustrates the result of the heating operation which evaporates or disintegrates the polyinsulation. The infrared operation, for example, is carried on for a period of about 5 to 10 seconds at a temperature of 2,000° to 2,500° F. During the heating step air contamination often occurs from the fumes as the poly-insulation is being evaporated or disintegrated. A hood and exhaust fan, not shown, should be used to remove these fumes since poly-insulation fumes may be toxic. Alternatively, pressurized air could be forced through the work area to carry away the fumes.

After the thermal energy heating process has evaporated or disintegrated the poly-insulation, a cut is made, either mechanically or by clean thermal energy, across the front and back of the poly-insulation along the path indicated at 35. Since poly-insulation is inherently slippery, an abrasive material such as carborundum, sandpaper, roughened steel or the mechanical cutter itself is used to slide a portion of the poly-insulation material 37 over the area 33 where the poly insulation was previously removed.

The insulation 37 to be slid is equal or greater in length L than the amount of insulation 33 removed. Hence a new portion of the flat cable 11 is exposed for use in the various connections. This new portion of the flat pack has not been subjected to possible thermal distortion from the heat, and therefore, will retain its maximum electrical contact properties. Since the conductors 13 are quite small it is possible to disrupt the parallel spacing between the conductors during the heating and tension in the jig. This distortion of the spacing is compensated for by sliding the section of insulation 37; the conductors 13 are realigned as the insulation is slid over the previously exposed wires.

If the disintegration of the poly-insulation is incomplete it is possible for a residue, such as pigment from colored insulation, to remain on the conductors. Therefore an additional step, prior to cutting and sliding the adjacent polyinsulation may be desired. This step, which is optional, is to clean the wires ultrasonically to remove the residue. In the polyimide types of insulation this residue may also be cleaned by using alcohol.

In the optional method including painting the poly-insulation, the coloring agent, e.g., paint, does not disintegrate as the poly-insulation does but leaves an oxide in a normal atmsphere. Hence if this method is used it is appropriate to use an inert atmosphere such as nitrogen. Of course the inert atmosphere could always be used and this would prevent oxidation of any partly disintegrated poly-insulation.

Furthermore, the use of an additional shield between the sources 17, 19 and the cable 11 may be desired to block the cable until the sources reach their operating temperature which may take, in the case of infrared, an additional ten seconds. Also the masking technique may be a built-in capability of the source, i.e., the source may include a diaphragm which is shaped to the desired configuration. Similarly the source may include optical systems including lenses and reflectors to shape and direct the thermal energy.

This invention has been described in the environment of stripping poly-insulation type coatings from a flat cable or bundle of wires. It is obvious, however, that the method may be used to remove many different types of insulation. Our invention, therefore, should only be limited by the scope of the appended claims.

What is claimed is:

1. A method of stripping poly-insulation from an inboard section of conductors in a cable comprising the steps of:

focusing the radiant energy of at least one infra-red heat source on an inboard section of insulation to cause said insulation to vaporize and expose the conductors;

mechanically cutting the insulation adjacent to the exposed conductor section; and sliding the cut insulation over the exposed conductors thereby exposing other inboard portions of the conductors.

2. The method of claim 1 wherein the step of focusing also includes selectively masking the insulation on certain of the conductors whereby the insulation on certain of the conductors may be simultaneously vaporized to expose desired conductors while not vaporizing the others.

References Cited

UNITED STATES PATENTS

| | | | |
|---|---|---|---|
| 2,432,868 | 12/1947 | Earl et al. | 134—19 |
| 3,374,117 | 3/1968 | Savage | 134—2 |
| 2,861,166 | 11/1958 | Cargill. | |
| 2,927,187 | 3/1960 | Wendelken | 219—349 |
| 3,242,314 | 3/1966 | Eckles | 219—347 |
| 3,621,198 | 11/1971 | Herbrich | 219—349 |
| 3,374,531 | 3/1968 | Bruce. | |
| 3,123,084 | 3/1964 | Tardoskegyi | 134—1 X |
| 3,596,045 | 3/1966 | Steigerwald | 219—347 X |
| 3,609,283 | 9/1971 | Costello | 219—347 X |
| 3,659,332 | 5/1972 | Morrone | 134—19 X |
| 2,083,407 | 6/1937 | Scranton | 134—6 UX |
| 3,275,486 | 9/1966 | Schroeder | 134—38 X |
| 3,331,718 | 7/1967 | Ruffing | 134—38 X |

FOREIGN PATENTS

| | | |
|---|---|---|
| 586,425 | 3/1947 | Great Britain. |

OTHER REFERENCES

IBM Tech. Disclosure Bull., vol. II, No. 9, February 1969, Smith et al., p. 1151.

IBM Tech. Disclosure Bull., vol. II, No. 7, December 1968, Piggin, p. 872.

BARRY S. RICHMAN, Primary Examiner.

U.S. Cl. X.R.

29—427; 134—6, 19, 38; 219—347, 349